United States Patent
Smits et al.

(10) Patent No.: US 7,334,465 B2
(45) Date of Patent: Feb. 26, 2008

(54) INTEGRATED LOGGING TOOL FOR BOREHOLE

(75) Inventors: Jan Wouter Smits, Sugar Land, TX (US); Christian Stoller, Kingwood, TX (US); Michael Evans, Missouri City, TX (US); Patrick Fisseler, Missouri City, TX (US); Robert Adolph, Pennington, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/438,638

(22) Filed: May 22, 2006

(65) Prior Publication Data

US 2007/0119243 A1    May 31, 2007

(51) Int. Cl.
*G01V 5/12* (2006.01)
*G01V 5/04* (2006.01)
*G01V 5/10* (2006.01)
*G01N 23/00* (2006.01)

(52) U.S. Cl. .................... 73/152.14; 702/8; 250/269.3; 250/269.4; 250/269.6; 250/269.7

(58) Field of Classification Search ............ 73/152.05, 73/152.14, 152.19, 152.46, 152.54; 340/840.38; 324/332, 333; 166/250.01; 250/269.3, 269.4, 250/269.5, 269.6
See application file for complete search history.

(56) References Cited

U.S. PATENT DOCUMENTS

| | | | |
|---|---|---|---|
| 3,558,888 A | 1/1971 | Youmans | 250/269.2 |
| 3,780,303 A | 12/1973 | Smith, Jr. et al. | 250/301 |
| 3,849,646 A | 11/1974 | MiKinlay et al. | 376/163 |
| 4,169,979 A | 10/1979 | Arnold et al. | 250/266 |
| 5,250,806 A | 10/1993 | Rhein-Knudsen et al. | 250/254 |
| 6,376,838 B1 | 4/2002 | Odom | 250/269.6 |
| 6,766,855 B2 | 7/2004 | Snoga | 166/254.1 |
| 6,944,548 B2 | 9/2005 | Radtke et al. | 702/8 |
| 2002/0170348 A1 | 11/2002 | Roscoe et al. | 73/152.02 |
| 2003/0141872 A1* | 7/2003 | Clark et al. | 324/339 |

* cited by examiner

*Primary Examiner*—Hezron Williams
*Assistant Examiner*—Tamiko Bellamy
(74) *Attorney, Agent, or Firm*—Matthias Abrell; Kevin P. McEnaney; Dale V. Gaudier

(57) ABSTRACT

An apparatus for measuring characteristics of earth formations surrounding a borehole, comprises a resistivity measurement device having a multiplicity of antennae spaced between each other in a longitudinal direction of the apparatus. A neutron measurement device of the apparatus comprises at least a neutron source and at least a neutron detector, each of the neutron detectors being at a distance from the neutron source in the longitudinal direction of the apparatus. The multiplicity of antennae are interleaved with the neutron measurement device in order to reduce a total length of the apparatus and in order to allow a determined area of the earth formation to be measured simultaneously using the neutron measurement device and the resistivity measurement device.

9 Claims, 5 Drawing Sheets

INTEGRATED LOGGING TOOL FOR BOREHOLE

BACKGROUND OF THE INVENTION

1. Field of the Invention

The invention relates generally to devices and methods for measuring earth formation properties, wherein the measurements may be made while drilling or while performing a wireline measurement.

2. Background Art

A Logging While Drilling apparatus (LWD) is commonly used in boreholes to perform measurements. A known LWD apparatus may include a combination of measurement devices that allows to obtain a number of different measurements using only one apparatus. It is for example common to use a combination of three measurement devices in an apparatus called triple combo. The known triple combo allows measurements of resistivity, neutron porosity, formation bulk density, formation photoelectric factor and natural gamma-ray to be performed. Alternatively, the combination of measurement devices may possibly be used in other logging configuration such as for example in a wireline logging apparatus.

Due to technical constraints when mounting the three measurement devices in a single LWD apparatus, the triple combo must have a minimum length that generally measures approximately 18 m. The length of the triple combo may be a constraint to access certain environments, e.g. an environment in which the borehole defines a curve.

SUMMARY OF INVENTION

In a first aspect the invention provides an apparatus for measuring characteristics of earth formations surrounding a borehole. The apparatus comprises a resistivity measurement device having a multiplicity of antennae spaced between each other in a longitudinal direction of the apparatus. The apparatus further comprises a neutron measurement device comprising at least a neutron source and at least a neutron detector, each of the neutron detectors being at a distance from the neutron source in the longitudinal direction of the apparatus. The multiplicity of antennae are interleaved with the neutron measurement device in order to reduce a total length of the apparatus and in order to allow a determined area of the earth formation to be measured simultaneously using the neutron measurement device and the resistivity measurement device.

In a first preferred embodiment the apparatus further comprises a first plurality of gamma ray detectors interleaved with the neutron measurement device, each of the first plurality of gamma ray detectors being at a distance from the neutron source in the longitudinal direction of the apparatus.

In a second preferred embodiment the apparatus comprises a natural gamma ray detector, wherein the natural gamma ray detector is spaced from the neutron source in the longitudinal direction of the apparatus.

In a third preferred embodiment the neutron measurement device is located longitudinally on a trailing side of the apparatus relative to the natural gamma ray detector, the trailing side being defined relative to a movement of the apparatus in the borehole.

In a fourth preferred embodiment the apparatus further comprises a gamma ray measurement device comprising at least a gamma ray source and a second plurality of gamma ray detectors, each of the second plurality of gamma ray detectors being at a distance from the gamma ray source in the longitudinal direction of the apparatus.

In a fifth preferred embodiment the neutron measurement device is located longitudinally on the trailing side of the apparatus relative to the gamma ray measurement device.

In a sixth preferred embodiment the neutron measurement device comprises a pulsed neutron source.

In a seventh preferred embodiment the apparatus further comprises a neutron monitor to measure an output of the neutron source.

In an eighth preferred embodiment the neutron measurement device comprises a chemical neutron source.

In a ninth preferred embodiment the apparatus further comprises an x-ray measurement device, the x-ray measurement comprising at least an x-ray source and an x-ray detector, the x-ray detector being at a distance from the x-ray source in the longitudinal direction of the apparatus.

In a tenth preferred embodiment the apparatus further comprises an ultrasonic measurement device.

In an eleventh preferred embodiment the apparatus further comprises a mud pressure sensor.

In a twelfth preferred embodiment the apparatus further comprises at least a galvanic resistivity sensor.

In a thirteenth preferred embodiment the apparatus further comprises a least a tilted antenna coil in order to perform an electromagnetic measurement with directional sensitivity.

In a fourteenth preferred embodiment the apparatus is mounted in a logging while drilling tool.

In a fifteenth preferred embodiment the apparatus is mounted in a wireline logging tool.

In a second aspect the invention provides an apparatus for measuring characteristics of earth formations surrounding a borehole. The apparatus comprises a resistivity measurement device having a multiplicity of antennae spaced between each other in a longitudinal direction of the apparatus, and a gamma ray measurement device comprising at least a gamma ray source and a plurality of gamma ray detectors, each of the plurality of gamma ray detectors being at a distance from the gamma ray source in the longitudinal direction of the apparatus. The multiplicity of antennae are interleaved with the gamma measurement device in order to reduce a total length of the apparatus and in order to allow a determined area of the earth formation to be measured simultaneously using the gamma measurement device and the resistivity measurement device.

In a third aspect the invention provides a method for processing data from a well logging tool carrying at least a neutron source, a neutron detector and a gamma ray detector. The method comprises counting output signals respectively from each detector, as a function of an azimuthal position of the logging tool, counting respectively for each detector the counted output signals for an azimuthal position, as a function of a time of arrival of the output signal, and counting respectively for each gamma ray detector the counted output signals for an azimuthal position as a function of a pulse height of the output signal.

Other aspects and advantages of the invention will be apparent from the following description and the appended claims.

BRIEF DESCRIPTION OF DRAWINGS

The invention will now be described in greater detail with reference to the accompanying drawings, in which.

DETAILED DESCRIPTION

General Overview of Prior Art

Known triple combo devices may perform a number of measurements as will be described in the following overview of measurements. Certain measurements may be specific to triple combo implemented on a wireline or on a LWD. It is assumed that the described measurements are known by a person skilled in the art and therefore no detailed explanation of each measurement is given here.

Formation resistivity measurements may be performed according to one or several of the following methods:
  direct resistivity measurement (typically wireline);
  induction measurement (typically wireline);
  propagation resistivity (typically LWD).

Neutron porosity measurements may be obtained using one or several of the following methods. Measurements are obtained from detection of scattered neutrons with neutron detectors. Two types of porosities may be measured: thermal and epithermal porosities. The distinction between thermal and epithermal porosities may be made depending on the detectors used. A thermal detector may detect both epithermal and thermal neutrons, the latter generally being more abundant than the former. An epithermal may only detect epithermal neutrons. The measurement methods are as follows:
  thermal neutron porosity measurement using a chemical neutron source;
  epithermal neutron porosity measurement using a chemical neutron source;
  epithermal neutron porosity measurement using a pulsed neutron generator;
  thermal neutron porosity measurement using a pulsed neutron generator.

Neutron porosity measurements may alternatively be obtained by using a neutron source, e.g., a chemical neutron source or a pulsed neutron source, and by measuring the neutron induced gamma-ray count rates with one or more gamma-ray detectors.

Formation bulk density measurements may be obtained from Compton scattering of gamma-rays.

Formation photoelectric factor PEF measurements may be obtained from a spectral distribution of scattered gamma-rays. The PEF measurements may be made using a same equipment as for the Formation bulk density measurements. The PEF may allow the identification of a formation lithology. It relies on the photoelectric absorption of Compton scattered gamma-rays which is very sensitive to the effective atomic number of the elements in the formation.

Natural Gamma-Ray Measurements.

Figure 1:
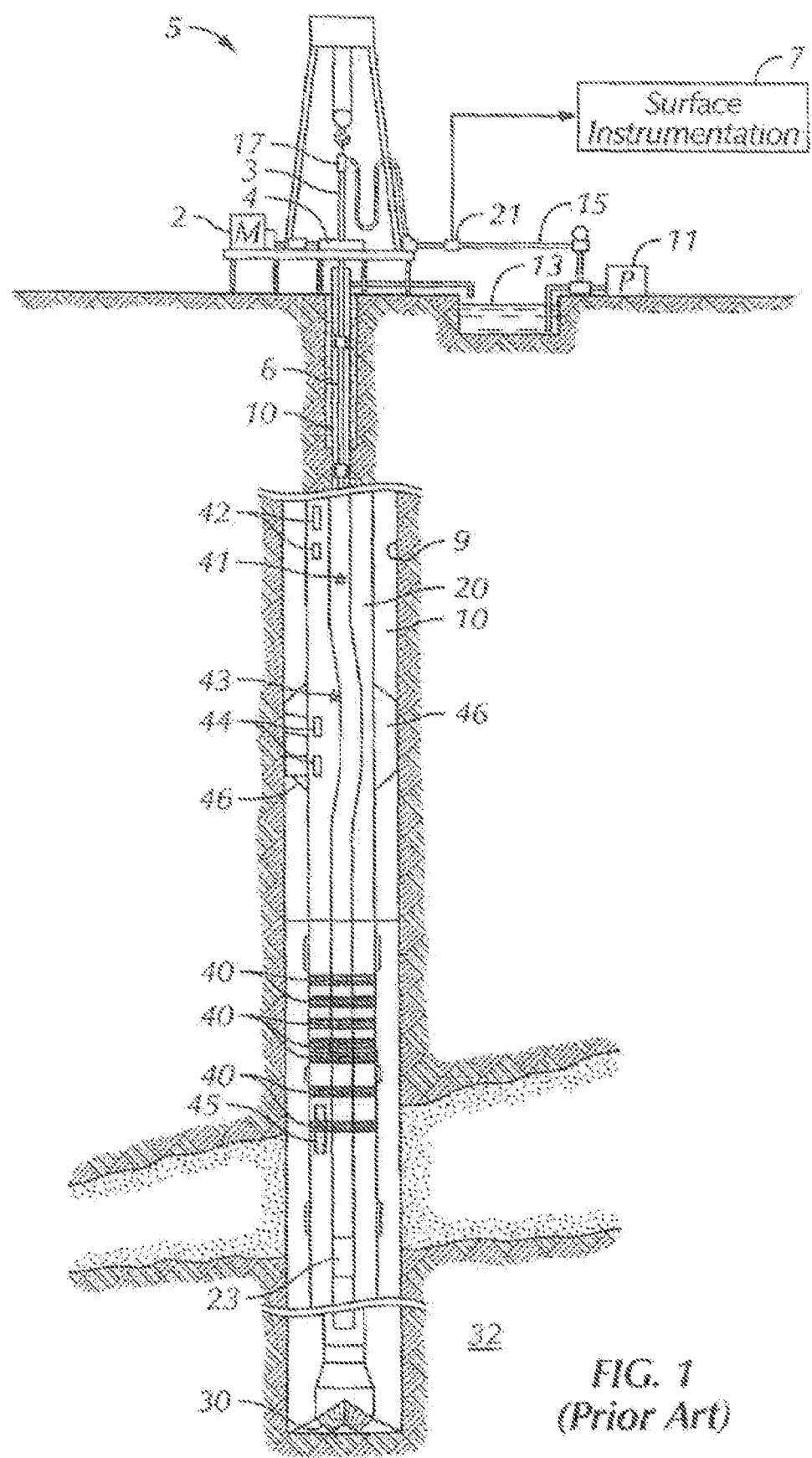
FIG. 1 shows a Logging while drilling tool from prior art.

FIG. 1 illustrates a typical rotary drilling rig system 5 having an example apparatus for LWD known from prior art, that allows to perform measurements of resistivity, neutron porosity, formation bulk density, formation photoelectric factor and natural gamma-ray. The illustration shows different sections of the rig assembly and varying scales have been used between the different sections in order to achieve an easier understanding. Downhole measurements are conducted by measurement devices placed in and/or on a drill collar 20. Such measurements may be stored in memory apparatus of the downhole measurement devices, or may be telemetered to the surface via conventional LWD telemetering apparatus and methods. For that purpose, a data signaling device module 23 receives signals from measurement devices of collar 20, and telemeters them via the mud path of drill string 6 and ultimately to surface instrumentation 7 via a pressure sensor 21 in stand pipe 15.

Drilling rig 5 includes a motor 2 which turns a Kelly 3 by means of a rotary table 4. The drill string 6 includes sections of drill pipe connected end-to-end to the Kelly and turned thereby. The drill collar 20 of this invention, as well as other conventional collars and other LWD tools, are attached to the drilling string 6. Such collars and tools form a bottom hole drilling assembly between the drill string 6 and a drilling bit 30.

As the drill string 6 and the bottom hole assembly turn, the drill bit 30 bores a borehole 9 through earth formations 32. An annulus 10 is defined as a portion of the borehole 9 between the outside of the drill string 6 including the bottom hole assembly and the earth formations 32.

Drilling fluid or "mud" is forced by a pump 11 from mud pit 13 via stand pipe 15 and revolving injector head 17 through a hollow center of Kelly 3 and drill string 6 to the bit 30. The mud acts to lubricate drill bit 30 and to carry borehole cuttings upwardly to the surface via annulus 10. The mud is delivered to mud pit 13 where it is separated from borehole cuttings and the like, degassed, and returned for application again to the drill string.

The collar 20, i.e., the tool comprises resistivity antennae 40 to perform propagation resistivity measurements and determine the formation resistivity.

Neutron porosity may be determined by detecting neutrons emitted from neutron source 41 and scattered back to neutron detectors 42.

The formation bulk density may be obtained from Compton scattering of gamma rays. The gamma rays are emitted by a gamma ray source 43 and detected by gamma-rays detectors 44.

The formation photoelectric factor may be obtained using the same gamma ray source 43 and gamma ray detectors 44 by looking at a spectral distribution of back scattered gamma rays.

The photoelectric factor may be used to identify the formation lithology. A natural gamma ray detector 45 may be used to measure natural gamma rays in the borehole.

Optional stabilizers 46 may be mounted on the outer periphery of the tool in order to maintain the tool centered in the borehole 9.

Overlaid Neutron and Resistivity Measurement Devices

Figure 2:
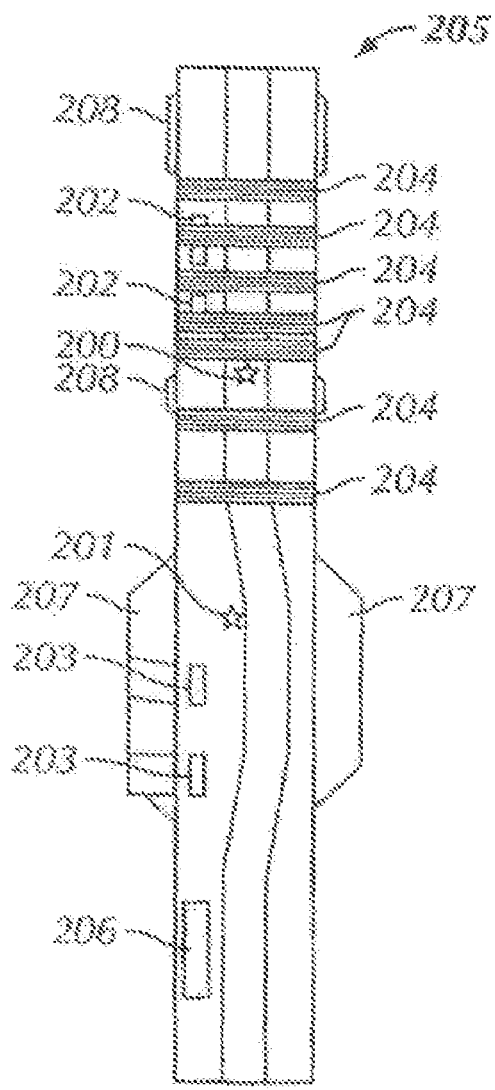
FIG. 2 contains an illustration of a first example apparatus according to the invention.

FIG. 2 show an example of a tool 205 according to the invention. The tool 205 uses chemical sources, i.e. a chemical neutron source 200 and a chemical gamma ray source 201.

Neutron Porosity Section.

The chemical neutron source 200 produces neutrons that are eventually scattered back to neutron detectors 202. The results of measurements from the neutron detectors 202 may be used to determine the neutron porosity.

A typical chemical neutron source is the $^{241}$AmBe source, which produces a spectrum of high energy neutrons through the nuclear reaction of the alpha-particles emitted by the $^{241}$Am decay with $^9$Be, as illustrated in following reaction:

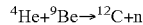

Alternatively a source of $^{252}$Cf can be used. The latter source produces neutrons as a consequence of the spontaneous fission of the heavy nucleus of $^{252}$Cf.

Gamma Density Section

In a gamma density section of the tool 205, the chemical gamma ray source 201 produces gamma rays that are scattered back to gamma ray detectors 203. Although 2 gamma ray detectors 203 are illustrated in FIG. 2, it is understood that this is an example only and that the number of gamma ray detectors 203 may well be different. Furthermore it is understood that the position of the gamma ray detectors 203 "below" the gamma ray source 203 in FIG. 2 may be varied relatively to the gamma ray source 201, e.g. to a position "above" the gamma ray source 203. The terms "below" and "above" are used here only in the frame of the figure and are not intended to give an absolute orientation of the tool when in use, e.g., the terms "below" and "above" are not necessarily intended to refer to an orientation given by gravity or any other direction. The results of measurements from the gamma ray detectors 203 may be used to determine the formation bulk density and the formation photoelectric factor.

It should be noted that the neutron source activates the formation causing delayed gamma-ray emission. In order to avoid that the delayed gamma-ray emission is recorded by the gamma-ray detectors of the tool, the gamma-ray detectors must be located in a leading position of the tool, i.e. a position that is in front of the tool when the tool is moved during the logging operation. LWD logging is typically done while drilling, i.e. the detectors should be located on a downhole side of the tool in order to be the first on the tool to "see" a given zone of the formation being drilled.

In the vast majority of the cases wireline logging is done while moving the tool from the bottom to the top in an uphole direction, i.e. the tool is first lowered in the borehole and logging is done while the tool is pulled out of the hole. In this case it is preferable that any measurement which has an indirect influence on an other measurement through formation activation, is located at the downhole side, i.e. at a trailing side of the tool in order to minimize its impact.

However, there may be other considerations which may require that the order of the measurements should be changed.

A typical element for the chemical gamma ray source 201 may be $^{137}$Cs.

Preferably the gamma ray detectors 203 may be mounted behind optional stabilizers 207 equipped with gamma ray windows. This provides an optimal formation contact while minimizing an absorption of gamma rays in the stabilizers 207.

A typical distance between the two gamma ray detectors 203 and the gamma ray source 201 may typically vary between respectively 0.12 and 0.24 m when the gamma ray detectors 203 are relatively close to the gamma ray source 201 and respectively 0.30 to 0.55 m when the gamma ray detectors 203 are farther away from the gamma ray source 201.

Figure 4:
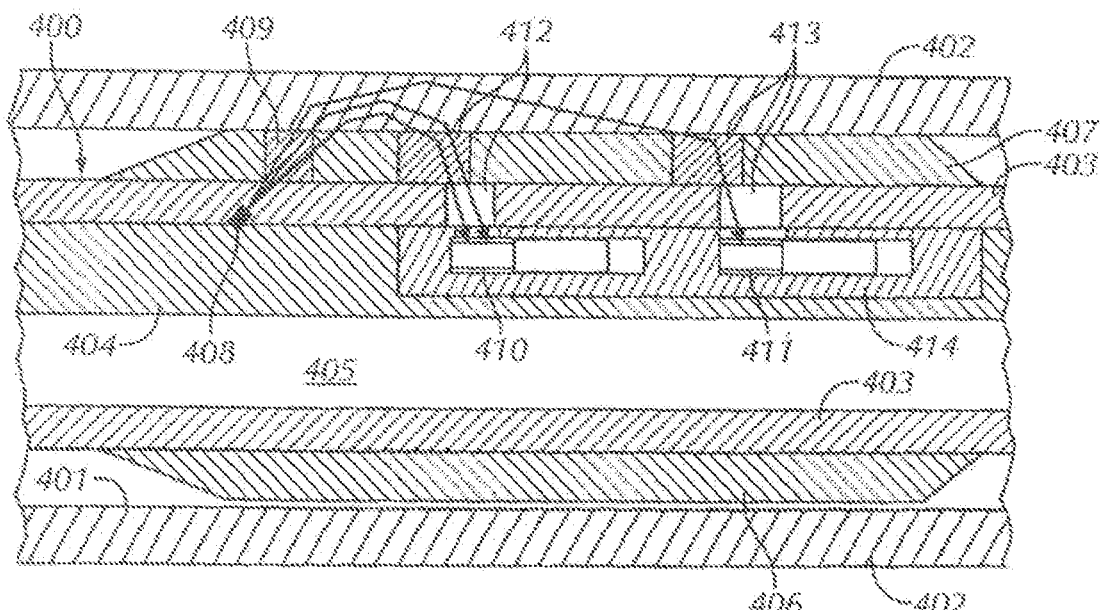
FIG. 4 contains an illustration of an example embodiment of a gamma ray section.

FIG. 4 shows a detailed example embodiment of a gamma density section, i.e. a density tool 400 inside a borehole 401 that penetrates an earth formation 402. The density tool 400 comprises a collar 403. The collar 403 contains a chassis 404 that defines a mudchannel 405. Stabilizers 406 and 407 are mounted on the collar 403 and provide an improved contact between the density tool 400 and the formation 402. The improved contact may reduce the effect of gamma ray transport in mud that flows through the borehole between the windows and the formation. A gamma ray source 408 is mounted in the collar 403. It is understood that the gamma ray source 408 may also be mounted in the chassis 404 instead of in the collar 403.

Gamma rays emitted from the gamma ray source 408 pass through a window 409 of low density material towards the formation 402. Alternatively the use of the window 409 could be made optional if an appropriate material is used for the stabilizer 407 to let the gamma ray pass from the source 408 to the formation 402. Gamma rays are scattered on the formation and detected by at least 2 detectors 410 and 411 mounted behind windows 412 and 413, or alternatively behind the stabilizer 407 made of appropriate material to let the gamma rays pass. A direct passage of the gamma rays from the source 408 to either one of the detectors 410 or 411 may be prevented by shielding with a high density material 414 such as for example tungsten.

Alternatively, the gamma-ray source can be replaced by an electronic source of X-rays. X-rays and gamma-rays are indistinguishable if they have the same energy. X-rays could be produced by traditional x-ray tubes coupled to a high voltage supply. Alternatively the x-rays could be generated by a device such as a linear electron accelerator or a circular accelerator like a betatron. While the measurement (shielding, detectors spacing, windows etc) needs to be adapted when using a different device, the basic measurement remains the same.

Resistivity Section

Resistivity antennae 204 are positioned on the tool 205 to at least partly overlap with the neutron detectors 202. The resistivity antennae are used to perform propagation resistivity measurements. Typical measurement frequencies are 400 kHz and 2 MHz, but other, higher and/or lower, frequencies may be used to achieve different measurement characteristics.

Natural Gamma Ray Section

A natural gamma ray detector 206 is positioned towards an extremity of the tool 205 opposite to the extremity carrying the neutron measurement devices 200 and 202, and the resistivity antennae 204.

The natural gamma ray detector 206 should preferably be positioned at a sufficient distance from the neutron source 200 in order to reduce the detection of gamma rays from the gamma-rays caused by neutrons emitted by the neutron source 200.

Preferably, the gamma-ray detector is positioned to be leading the neutron source during the measurement, i.e. to be at a position on the tool leading a movement of the tool, so that it is not affected by the activation of materials in the formation and the downward-flowing mud caused by the neutron source 200.

In addition the natural gamma ray detector should also be sufficiently distant from the gamma ray source 201 in order to avoid measuring gamma rays emitted from the gamma ray source 200.

The overlay of the neutron measurement devices 200 and 201, with the resistivity antennae 204 allows to achieve a tool 205 that is substantially shorter than the tool 20 from prior art shown in FIG. 1.

Wearbands 208 may be mounted in proximity of the resistivity antennae 204 to prevent a damaging of the resistivity antennae 204 by contact or friction with the formation.

Figure 3:
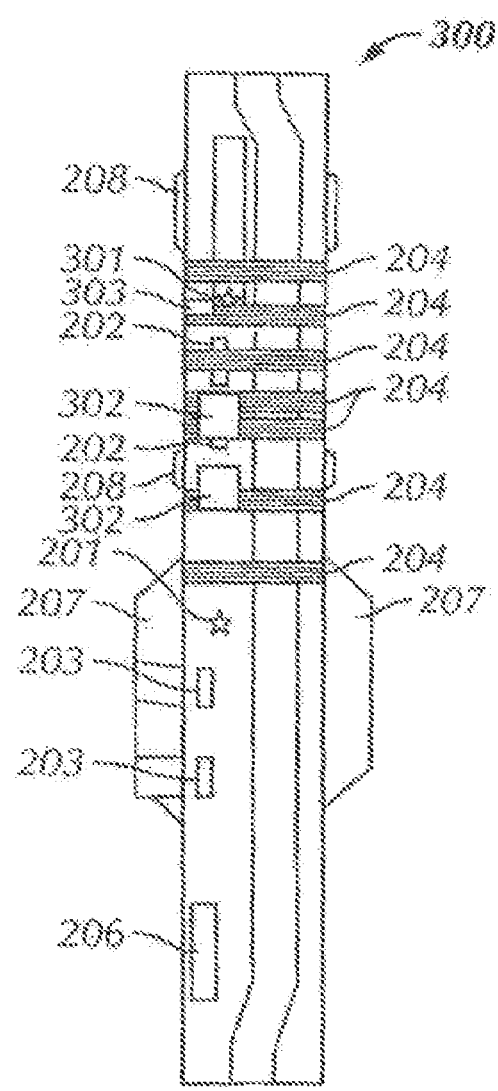
FIG. 3 contains an illustration of a second example apparatus according to the invention.

FIG. 3 shows a further example of a tool 300 according to the invention.

Same reference numbers have been used in FIG. 3 and FIG. 2 to reference same elements.

The gamma-ray density section and the natural gamma ray section are similar to the respective corresponding sections shown in FIG. 2. Specific characteristics differentiating the tool 300 from the tool shown in FIG. 2 will now be described.

In the tool 300, the chemical neutron source 200 is replaced by a pulsed neutron source 301, e.g. a neutron generator using a d-T reaction. The pulsed neutron source 301 comprises a high voltage supply, typically in a range of 70 to 100 kV, and a vacuum tube in which deuterium and tritium ions are first generated and then accelerated onto a target containing tritium and deuterium The reaction between a deuterium and a tritium nucleus results in the emission of a neutron with an energy of about 14 MeV.

The neutron porosity section of tool 300 is interleaved with the resistivity section. The neutron porosity section is located at a distance from the gamma ray density section that is sufficient to prevent radiation created by the neutrons emitted by the pulsed neutron source 301 from reaching the gamma ray density section. Similarly the distance between both neutron and gamma ray sections prevents radiation created by the gamma rays emitted by the gamma ray source from reaching the neutron section. A distance separating both neutron and gamma ray section may generally be 1.2 m and needs to be adapted to the strength of the sources used.

Preferably, the neutron porosity section is located on the tool 300 such that the gamma ray density measurement may be executed at first before the neutron porosity measurement when the tool 300 is inserted in the borehole. This may prevent the density measurement to be biased by formation and drilling mud activation caused by the neutron emitted from the neutron porosity section. In case the neutron porosity measurements needs to be done in order before the gamma ray density measurements, it may be necessary to correct the density measurement.

The neutron detectors 202 are located at 2 different distances from the pulsed neutron source 301. The neutron detectors 202 are thermal and/or epithermal neutron detectors, e.g., $^3$He proportional detectors. The tool 300 further comprises two gamma ray detectors 302 interleaved with the neutron porosity section. Various shielding devices may be used to minimize a direct passage of neutrons from the source 301 to the detectors 202, and to enhance azimuthal response. The shielding devices further allow to reduce the detection by the gamma ray detectors 302 of gamma rays generated by gamma ray source 201 of the tool 300. The shielding material may typically be tungsten (not shown in FIG. 3) when used close to the neutron generator 301, or close to the gamma ray detectors 302, and $^{10}$B (Boron 10) (not shown in FIG. 3) when used close to the neutron detectors 202.

A neutron monitor 303 is mounted in proximity of the neutron source 301 to determine or monitor the output of the neutron source. The measurement of the output of the neutron source may be used to normalize count rates measured at the neutron detectors 202 or the gamma-ray detectors 302. It may also be used to regulate the neutron source output. The neutron monitor 303 may typically be realized with a plastic scintillator that detects recoil protons.

The gamma ray detectors 302 are preferably realized using scintillation detectors, e.g., NaI(Th), BGO, CsI, GSO etc. Each gamma ray detector 302 is located at a different distance from the neutron source 301. A detector 302 located at the smallest distance from the source 301 may be used for a determination of an elemental composition of the formation by measurement and analysis of capture gamma ray spectra. The latter detector 302 may furthermore be used to measure a die-away of thermal gamma rays in order to deduce a neutron capture cross section of the formation and of the borehole. In addition the latter detector 302 may be used to measure gamma ray spectra from inelastic reactions of high energy neutrons. These gamma-ray spectra can be analyzed in order to add to the measurement of an elemental composition of the formation and/or for compensation of the density measurement.

A distinct detector 302 located at the furthest distance from the source 301 may be used to measure inelastic gamma ray spectra and count rate, that may in turn be used to deduce the formation bulk density. Furthermore the detector can measure the capture gamma ray spectra and the die-away of thermal gamma-rays albeit with much reduced statistics.

Similar as for the tool of FIG. 2, the resistivity antennae 204 are overlaid with the neutron source 301 and the detectors 202. The resistivity antennae 204 may be used as transmitter and receiver antennae. A positioning of the resistivity antennae 204 may be varied in order to obtain improved performance of nuclear measurements in the neutron porosity section.

Preferably a distance between the source 301 and a neutron detector 202 closest to the source may be between 20 cm and 40 cm. The distance for a neutron detector 202 further away from the source may be 50 cm to 80 cm.

Preferably a distance between the source 301 and the gamma ray detector 302 nearest to the source may be between 20 cm and 50 cm, while a distance between the source 301 and the gamma ray detector 302 furthest from the source may be between 60 cm and 100 cm or even more depending on the strength of the neutron source 301.

While FIG. 3 shows the neutron detectors 202 and the gamma ray detectors 302 in alternating positions, it is understood that this is an example only and that other positions may be envisaged. For example, neutron detectors 202 and gamma ray detectors 302 may be located at a same distance from the source 301, next to each other or integrated in order to produce simultaneous neutron and gamma ray measurements. It can also be envisaged that the gamma-ray detectors are located above the neutron source and the neutron detectors below the neutron source.

Figure 5A:
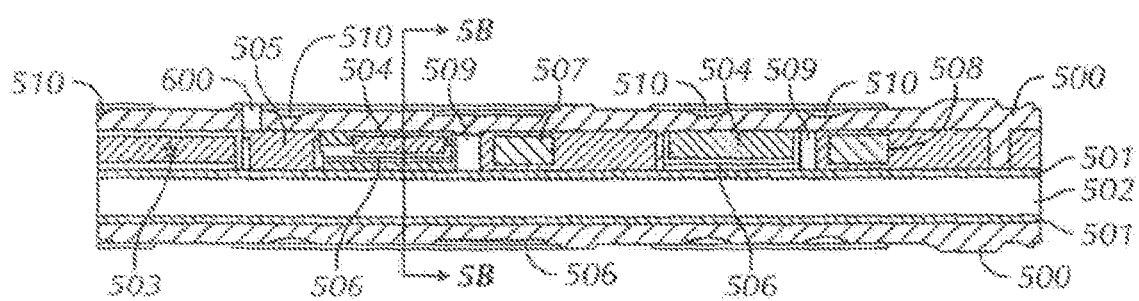
FIG. 5A contains an illustration of an example embodiment of a neutron porosity section.
Figure 5B:
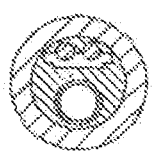
FIG. 5B contains a cross-section of the example embodiment of a neutron porosity section of FIG. 5A.

FIG. 5A shows an example embodiment of a neutron porosity section overlaid with a resistivity section., in a longitudinal and transversal cross sectional view of the tool. The neutron porosity section measurement devices are located inside a collar 500, mounted in a chassis 501. The chassis defines a mudchannel 502 allowing mud to flow through the tool. The neutron porosity measurement devices comprise a pulsed neutron source 503 and neutron detectors 504. A side of the tool on which the neutron source 503 is located would typically be uphole when the tool is inserted in the borehole, in order that the detectors 504 lead the source while drilling the borehole.

A tungsten block 505 located near to the source 503, i.e. on the right side of the source 503 in FIG. 5A, stops a transmission of gamma rays and reduces a direct flux of neutron from the source 503 towards the detectors 504.

A neutron detector 504 located nearest to the source 503, at a density neutral position, may in fact be a set of neutron detectors, comprising an epithermal neutron detector and a thermal neutron detector, and may be used to perform a near count rate determination to obtain a direct hydrogen index measurement. The notion "density neutral" indicates that at this position the neutron count rate is a function of the formation hydrogen index and other environmental variables. However, the neutron count rate is not influenced by changes in the bulk density of the formation, which are not accompanied by a change in the hydrogen index of the formation. A neutron detector 504 located furthest away from the source 503 may in fact be a set of thermal neutron detectors, and may be used to perform a far count rate measurement. The neutron porosity determination is based on a ratio of the near and far count rates.

The neutron detectors are shielded using a neutron shielding, e.g., a $^{10}$B shielding, in order to reduce a signal from neutron traveling through the borehole or through the mud channel.

A first gamma ray detector 507 is located between the 2 sets of neutron detectors 506. The first gamma ray detector 507 may be mainly used for the measurement of capture gamma ray spectra and a determination of sigma. Sigma is the macroscopic capture cross section of the formation. Sigma is inversely related to the thermal neutron die-away time.

A second gamma ray detector 508 may produce measurements that may be analyzed in conjunction with measurements from the first gamma ray detector 507 to obtain pulsed neutron density measurements. In addition the detector may be used to obtain a sigma measurement with a deeper depth of investigation.

Shields 509 located at the surface of the collar 500 shield the collar against thermal neutrons which can be captured in the collar and cause a strong gamma-ray background radiation which is added to the signal from the borehole and the formation. The shield 509 reduce the background signal in the gamma ray detectors 507 and 508 resulting from neutron capture in the collar 500 and the chassis 501.

Resistivity antennae 510 are mounted at an outer periphery of the tool. The position of the resistivity antennae 510 may be optimized as appropriate with respect to the detectors 506 to improve neutron detection. Alternatively, the antennae could be mounted integral to the collar or could be mounted inside the collar or on the chassis, in which case slots must be made in the collar to ensure that it is sufficiently transparent to the electromagnetic field.

Output responses from the neutron detectors 504 may be recorded as a function of time with respect to the neutron burst produced by the pulsed neutron source 503, and for every time bin in addition as a function of azimuth. More precisely, a time of interest for output responses from the epithermal detector may be during several 10 microseconds after the neutron burst, in order to determine the epithermal neutron die-away phenomenon, i.e. the Slowing Down Time SDT. Using output responses from the thermal neutron detector originating from thermal neutron die-away, it may be possible to deduce the formation capture cross section (Sigma).

Output responses from the first gamma ray detector 507 are recorded as a function of the following parameters: time, gamma ray energy deposited in the detector and azimuth. The latter output responses may be used to determine inelastic and capture gamma ray spectra and sigma.

Output responses from the second gamma ray detector 508 are recorded in a similar way as for gamma ray detector 507, and may be used generally for determining density from neutron induced gamma rays and spectroscopy, and sigma information if the statistical precision is sufficient.

As previously stated in relation to FIG. 3, the output responses, i.e. the count rates obtained at the detectors, are normalized by dividing the count rates by the rate of neutron emitted by the source 503 as measured by a neutron monitor 600. Hence it becomes possible to determine a porosity response from a single neutron detectors 506. A difference in the epithermal response and the thermal response at one single set of detectors 506 may be used as an indication of the presence of thermal neutron absorbers and correlates with Sigma.

Additional sensors can be added on the collar without increasing its length. These could be ultrasonic devices to give a measurement of the tool stand off, pressure sensors to determine the pressure in the borehole or additional small devices to determine properties of the mud. This could also include a direct local resistivity measurement.

Ultrasonic measurements are well known in the industry as a means to determine the tool stand off from the borehole wall. The tool stand off is determined by emitting an ultrasonic pulse from the tool and determining the time delay between the emission and the detection of the reflected signal (echo) in the tool. If the propagation velocity in the mud is known the tool stand off from the formation can be computed.

Pressure sensors are often used on LWD and MWD tools. Typically the pressure sensors are strain gauges. The pressure measurement has multiple applications while drilling. The pressure measurement may for example be used to make sure that the downhole pressure is neither too low nor too high, or for early detection of drilling problems like loss of circulation. The pressure measurement also makes it possible to estimate the mudweight and thus to obtain a better estimate of the sonic propagation speed in the mud.

A local resistivity measurement may be added to the tool using galvanic sensors to measure the resistivity of the formation. Such galvanic sensors measure resistivity by applying a voltage differential across parts of the tool which will cause currents to flow from the tool and into the formation. The voltage differential can for example be generated through inductive means, e.g., by use of toroidal coils, or by the use of electrodes. The resulting currents can be measured by similar means.

In a preferred embodiment, the resistivity section further comprises tilted antennae. This allows an azimuthally sensitive measurement of the resistivity. Azimuthal sensitivity is important in applications like geosteering but also for a better geological evaluation by determining the dip angle of layers in earth formations.

Data Processing

Figure 6:
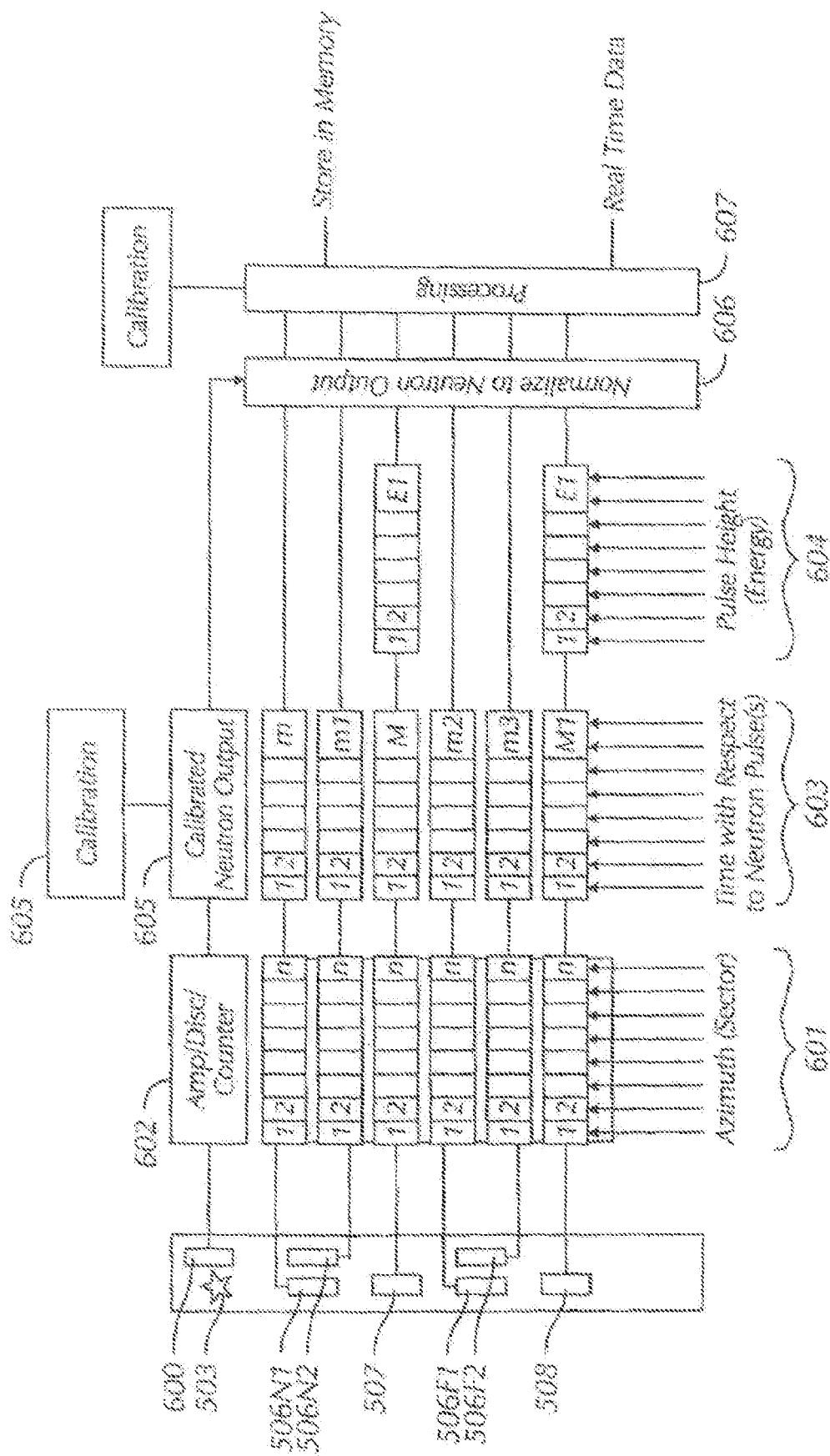
FIG. 6 contains an illustration of an example embodiment for a signal processing according to the invention.

FIG. 6 schematically illustrates a data acquisition process from the tool shown in FIG. 5A as a function of time, azimuth and energy.

Signals are obtained from each detector 506, 507 and 508. FIG. 6 shows detectors 506N1 and 506N2 corresponding to the set of neutron detectors located nearest to the neutron source 503. Detectors 506F1 and 506F2 correspond to the set of neutron detectors located furthest away from the neutron source 503.

A neutron monitor 600 is represented near to neutron source 503 to show that the pulsed neutron burst is monitored.

The signals of detectors 506, 507 and 508 are recorded as a function of the tool azimuth in the borehole in section 601. A granularity of azimuth sectors may vary depending on an azimuthal resolution of the measurement. For example, a granularity of 4 quadrants may be chosen.

In section 603 the measured counts are binned as a function of the time of arrival of the neutrons or gamma rays at the detectors. The time of arrival may be measured with respect to the neutron pulse cycle generated by the pulsed neutron source 503.

A width of the time bins and a number of the time bins may vary from one detector to an other detector, and may even vary for one detector.

In section 604 spectral data may be acquired from the gamma ray detectors 507 and 508. Signals are binned depending on a pulse height of the measured signals at the output of the detectors.

The output of the neutron source 503 is measured using the neutron monitor 600 and the counting equipment 602 in order to obtain an absolute count of neutrons that may be used in further processing of data obtained from detectors 506, 507 and 508.

In order to avoid a variation of results from one tool to an other tool, it is possible to calibrate the count rate using calibration 605.

Data obtained in sections 601, 602 and 603 are normalized (606) and made available for processing 607. The processing 607 may be done in real time, e.g. data may be sent uphole in real time, or data may be stored in a memory of the tool for later processing, e.g., for processing when the tool is returned to surface.

Figure 7:
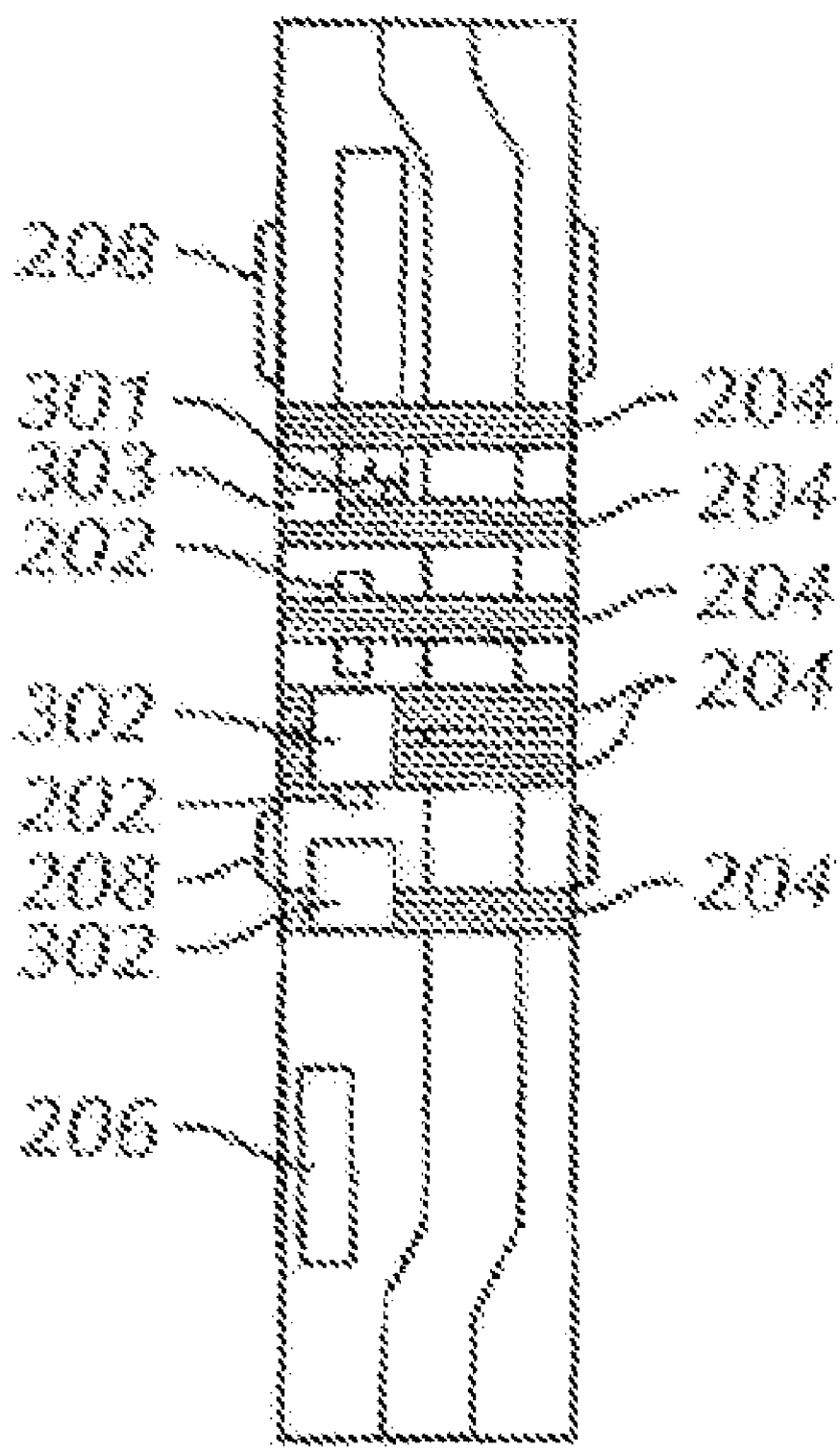
FIG. 7 contains an illustration of a third example apparatus according to the invention.

FIG. 7 illustrates a further preferred embodiment of the inventive tool. The tool of FIG. 7 comprises a resistivity section (204) overlaid with a neutron porosity section (301, 303, 202, 302), and a natural gamma ray detector 206 similar as the tool shown in FIG. 3. A difference with the tool form FIG. 3 is that the tool of FIG. 7 does not comprise any gamma density section. A distance separating the natural gamma ray detector 206 from the pulsed neutron source 301 may generally exceed 1.2 m.

As a result of omitting the gamma density section, the tool of FIG. 7 is substantially shorter than the tool from FIG. 3.

Various advantages result from the inventive tools.

A first advantage may be seen in the reduced length of the tool according to the invention. The length of the inventive triple combo is reduced to less than 10 m. The length is reduced even more in the embodiment shown in FIG. 7. The shorter length opens the possibility to use the inventive tool in difficult environments that were not accessible with the triple combo from prior art, where the measurements had to be made using a plurality of tools, and possibly involving multiple trips in the well. The inventive tool integrates the possibility to make a number of measurements that were made using 2 to 4 different tools in prior art. The inventive tool integrates the possibility to make all the measurements in a single tool that is shorter and more highly integrated than prior art tools.

A second advantage may be seen in the reduced costs for obtaining a tool according to the invention. It appears that the inventive tool is cheaper to produce than the triple combo from prior art.

A third advantage may be seen in that the shorter length of the inventive triple combo allows to apply a simpler and more accurate interpretation of measurement from the measuring devices. More particularly, the overlay of the resistivity and the neutron measurements devices allows to obtain simultaneous or quasi-simultaneous measurements for both measurements, the measure points being relatively close to each other, or being the same. Hence the resistivity and the neutron measurements may easily be correlated, producing a more accurate interpretation of measurements and a more precise understanding of the formation.

An additional advantage of the integration may be that the detectors of the inventive tool are located closer to the bit than in the tools known form prior art, giving earlier-time measurements after penetration of the earth formation. This may have important applications, e.g., in geosteering.

Various examples of embodiments for the invention have been described using LWD tools. It is understood that the invention may also be used in a wireline tool that is typically used to investigate the borehole after drilling.

In an alternate preferred embodiment it could be possible to interleave the resistivity antennae with the density measurement.

In a further preferred embodiment the antennae could overlap parts of the neutron and the density measurement.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for measuring characteristics of earth formations surrounding a borehole, comprising:
   a resistivity measurement device having a multiplicity of antennae spaced between each other in a longitudinal direction of the apparatus;
   a gamma ray measurement device comprising at least a gamma ray source and a plurality of gamma ray detectors, each of the plurality of gamma ray detectors being at a distance from the gamma ray source in the longitudinal direction of the apparatus,
   wherein the multiplicity of antennae are interleaved with the gamma measurement device such that at least an antenna of the resistivity measurement device is partly overlaid with at least the gamma ray detector, and
   wherein a shielding device is located between at least the gamma ray source and at least the gamma ray detector.

2. The apparatus according to claim 1, further comprising: an x-ray measurement device, the x-ray measurement device comprising at least an x-ray source and an x-ray detector, the x-ray detector being at a distance from the x-ray source in the longitudinal direction of the apparatus.

3. The apparatus according to claim 1, further comprising an ultrasonic measurement device.

4. The apparatus according to claim 1, further comprising a mud pressure sensor.

5. The apparatus according to claim 1, further comprising at least a galvanic resistivity sensor.

6. The apparatus according to claim 1, further comprising a tilted antenna coil in order to perform an electromagnetic measurement with directional sensitivity.

7. The apparatus according to claim 1, wherein the apparatus is mounted in a logging while drilling tool.

8. The apparatus according to claim 1, wherein the apparatus is mounted in a wireline logging tool.

9. An apparatus for measuring characteristics of earth formations surrounding a borehole, comprising:
   a resistivity measurement device having a multiplicity of antennae spaced between each other in a longitudinal direction of the apparatus;
   a gamma ray measurement device comprising at least a gamma ray source and a plurality of gamma ray detectors, each of the plurality of gamma ray detectors being at a distance from the gamma ray source in the longitudinal direction of the apparatus;
   a neutron measurement device comprising at least a neutron source and at least a neutron detector, each of the neutron detectors being at a distance from the neutron source in the longitudinal direction of the apparatus;

wherein the multiplicity of antennae are interleaved with the gamma measurement device and with the neutron measurement device such that at least an antenna of the resistivity measurement device is partly overlaid with at least the gamma ray detector, at least another antenna of the resistivity measurement device is partly overlaid with at least the neutron source, and at least another antenna of the resistivity measurement device is partly overlaid with at least the neutron detector, and wherein a shielding device is located between at least the gamma ray source and at least the gamma ray detector, and another shielding device is located between at least the neutron source and at least the neutron detector.

* * * * *